Dec. 8, 1931.  H. E. KAPLAN ET AL  1,835,405
AUTOMOBILE TOP
Filed May 24, 1929   2 Sheets-Sheet 1
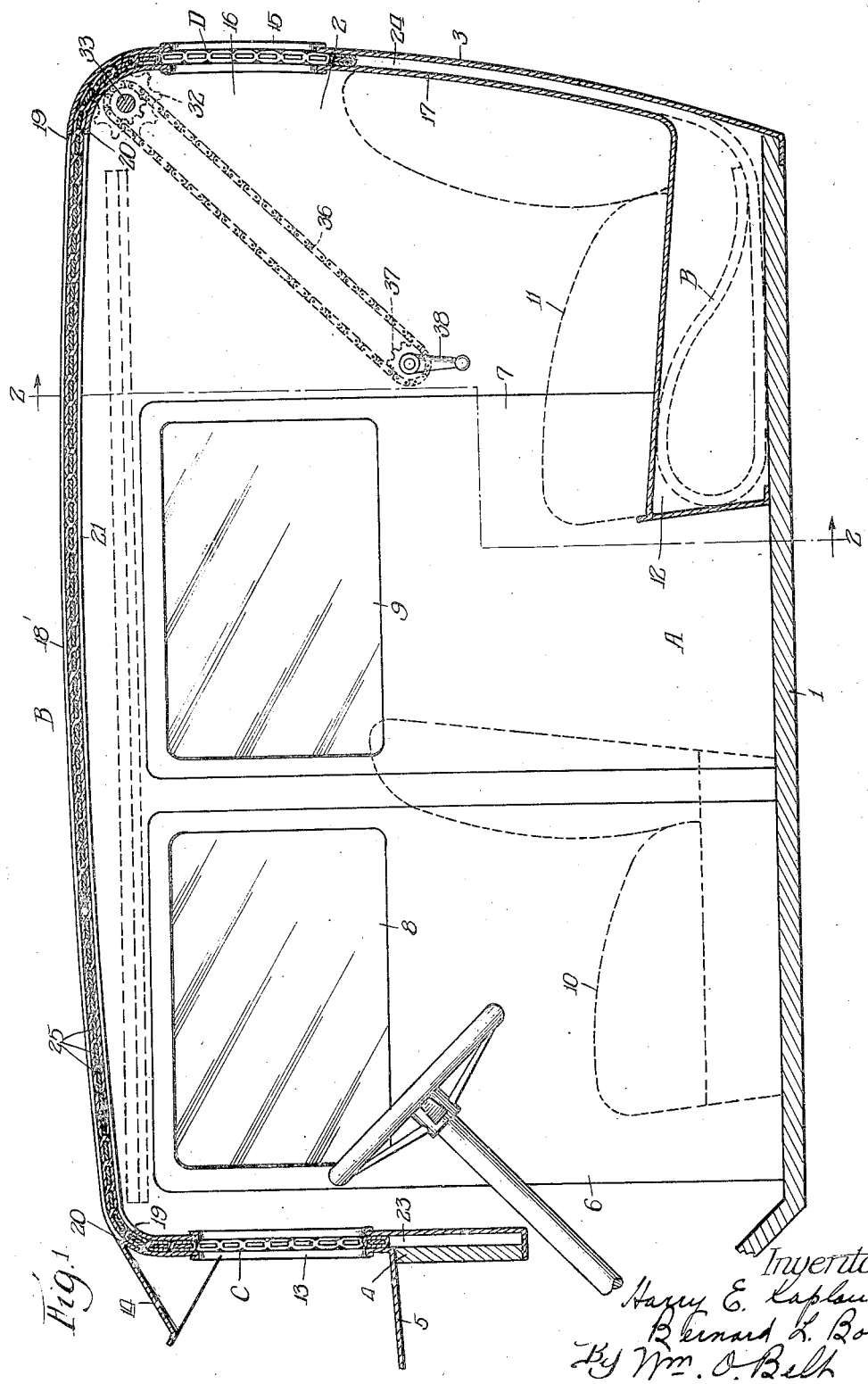

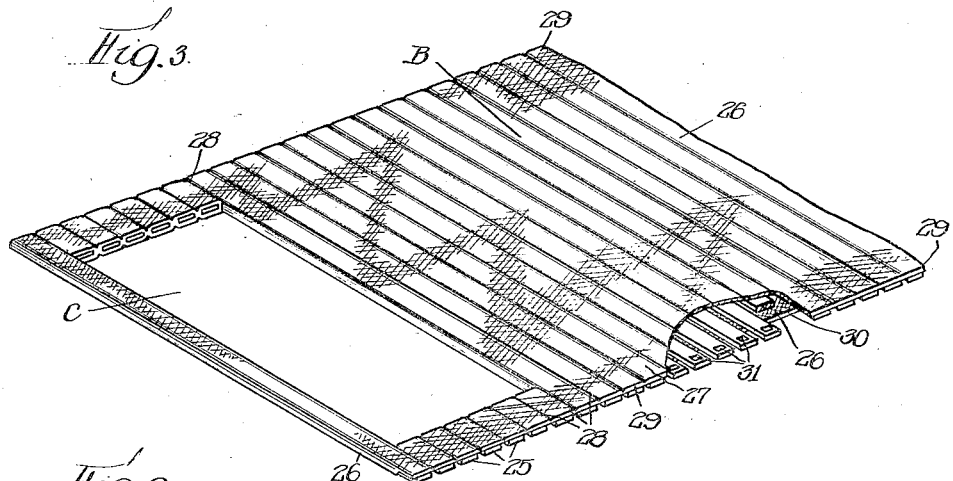

Patented Dec. 8, 1931                                                    1,835,405

UNITED STATES PATENT OFFICE

HARRY E. KAPLAN AND BERNARD L. BOUER, OF CHICAGO, ILLINOIS

AUTOMOBILE TOP

Application filed May 24, 1929. Serial No. 365,755.

Our invention relates to improvements in automobile bodies.

The principal object of our invention is to provide an automobile body of the closed type with a movable roof or top which can be opened or closed at will, and which will when opened provide all of the advantages of the open type of body and when closed provide all of the advantages of the closed type of body.

A further object is to provide an automobile body of the closed type with a roof or top which can be opened or closed conveniently from within the body.

A further object is to provide a novel roof or top structure for closed type automobile bodies which is strong, durable and waterproof and at the same time flexible to permit rolling or folding when operated to open or close the top within the body.

Other objects of our invention will appear hereinafter.

Referring to the drawings

Fig. 1 is a vertical longitudinal section of an automobile body embodying our invention.

Fig. 2 is a transverse vertical section substantially on the line 2—2 of Fig. 1, and Fig. 3 is a perspective view of a portion of the roof or top member with portions broken away to show the construction thereof.

In the accompanying drawings, particularly Fig. 1, we have shown a so-called sedan body or body of a closed type A having the usual floor 1, side walls 2, rear end wall 3 and front wall 4 connected with the cowl 5. The body has the usual front and rear doors 6 and 7 with front and rear windows 8 and 9 respectively. The usual front seat 10 and rear seat 11 is indicated in dotted lines. The rear seat has a compartment 12 beneath it for the purpose of receiving and storing the roof member as hereinafter described. The windshield opening at the front of the body is indicated by the frame 13 surrounding said opening, and a visor 14 extends from the front of the body at the top and overhangs the windshield in the usual manner. The body also has a rear window opening above the rear seat cushion, this being indicated by the frame 15.

Bodies of closed type are generally provided with inner side walls 16 and rear wall 17, and between these inner and outer walls the structure forming the body frame is located. The framework is not shown however since it constitutes no part of our present invention.

The top edge portions 18 of the outer side walls are rounded off and turned horizontally, terminating at 18', practically the entire length of the roof. The front and rear inner and outer walls curve upwardly and horizontally for a short distance and terminate in edges 19 and 20 respectively. This construction provides a roof or top opening extending practically throughout the entire area of the top of the body, and when this roof opening is uncovered by the sliding roof member all of the advantages of the open type body with top down is obtained, whereas with the top opening closed the structure is the same as a closed body.

Beneath the curved upper portions 18 of the side walls we provide guide and supporting members 21 which extend the length of the roof opening and merge at their front and rear ends with the top edges of the inner front and rear walls. These members 21 are spaced below the curved portions 18 of the side walls to form longitudinal guide channels or grooves 18'' along the side edges of the roof opening. These channels communicate at their ends with the spaces 23 and 24 formed between the inner and outer front and rear walls.

The roof member B is arranged to slide or travel in these guide channels and in the spaces 23 and 24 when it is moved or shifted to open or closed position. When this roof member is in position to close the roof opening, its forward end extends into the space 23 to a point below the windshield opening, and its rear end extends in the space 24 to a point below the rear window frame. At each end, however, the roof member has suitable openings C and D. The opening C, is substantially of the same size as the front windshield opening and registers therewith when the roof member is extended to closed position, and the opening D likewise corresponds to and registers with the rear window 15.

When it is desired to open the top of the body the roof member is slid or shifted rearwardly and downwardly in the space 24 at the rear end of the body. This space 24 communicates at its lower end with the compartment 12 beneath the rear seat so that the roof member can enter this compartment 12 and fold or coil up as indicated in dotted lines in Fig. 1, thereby conveniently storing the roof member while the roof opening is uncovered. It is obvious that the roof opening can be uncovered to any extent desired by sliding the roof member rearwardly accordingly.

The roof member B, Fig. 3, is of novel construction in that it is composed of a plurality of flat transverse ribs or strips 25 placed close together in parallel relation and enclosed between inner and outer layers of fabric 26 and 27 respectively so that the roof member will possess the proper flexibility to enable it to conform to and travel in its guide channels and spaces between the walls as previously described. The coverings or layers 26 and 27 may be of any suitable material for the purpose. We prefer, however, to use a waterproof fabric of proper flexibility for the purpose. The coverings and ribs are maintained in proper relation by transverse rows of stitching 28 which fasten the inner and outer coverings together in the spaces between the ribs 25. The outer covering 27 extends at its edges 29 to a point substantially flush with the ends of the ribs. The under or inner covering, however, extends at its edges 30 to a point short of the ends of the strips or ribs whereby to expose the end portions of these ribs along the longitudinal edges of the roof member on the under side thereof.

The end portions of the strips are provided with holes or openings 31 in series along each side of the roof member. These openings mesh with the teeth of gear or sprocket wheels 32 by means of which power is applied to the roof member to slide it rearwardly and forwardly in its guide channels. These gears are mounted on a transverse shaft 33 positioned in the upper rear corner of the body adjacent the inner rear wall thereof and having suitable bearings 34 in said inner and outer side walls. The inner rear wall 17 of the body has suitable openings 35 through which the gears extend to engage the teeth of the roof member. The shaft 33 is driven by a chain 36 which extends downwardly between the inner and outer side walls to a sprocket 37 which is mounted on a crank member 38. The crank is positioned adjacent the side wall at a point where it can be conveniently operated by a person occupying the rear seat. By means of this arrangement an occupant of the car may conveniently operate the roof member to uncover the roof opening without any particular effort. This can be done while the car is traveling, as often and to any degree desired.

The side edges of the roof member extend into the channels beyond the edges 18 sufficiently to provide overlapping joints between the walls of the channel and the roof member. Any water, however, that may get through this joint simply passes into the channels 18″ and is drained into the usual outside gutters 39 through the openings 40 in the outer side walls.

We are aware that changes in the form, construction and arrangement of parts may be made without departing from the scope and sacrificing the advantages of the invention, and we reserve the right to make all such changes as fairly fall within the scope of the following claims.

We claim:

1. An automobile body including inner and outer side walls, the outer side walls including inwardly directed portions at the upper ends thereof, the inner side walls having the upper ends thereof ended below and spaced from said inwardly directed portions, guide members extending across the space between said inner and outer side walls and rested on the upper ends of said inner side walls and cooperating with the inwardly directed portions to provide guide channels, and a flexible roof member having the edge portions thereof slidable in said guide channels and extendable between the front and rear walls of said body.

2. An automobile body including inner and outer side walls, the outer side walls including inwardly directed portions at the upper ends thereof, the inner side walls having the upper ends thereof ended below and spaced from said inwardly directed portions, guide members extending across the space between said inner and outer side walls and rested on the upper ends of said inner side walls and cooperating with the inwardly directed portions to provide guide channels, a flexible roof member having the edge portions thereof slidable in said guide channels, said body including a windshield at the front thereof and a window at the rear thereof, said roof member having openings therein adapted to register with said windshield and said window when said roof member is extended through said guide channels and along the front and rear of said body.

3. An automobile body including inner and outer side walls, the outer side walls including inwardly directed portions at the upper ends thereof, the inner side walls having the upper ends thereof ended below and spaced from said inwardly directed portions, guide members extending across the space between said inner and outer side walls and rested on the upper ends of said inner side walls and cooperating with the inwardly directed portions to provide guide channels, and a flexible roof member having the edge portions thereof slidable in said guide channels and extendable between the front and rear walls of said body, said outer side walls having openings therein communicating with said guide channels above said guide members to permit passage of water from said guide channels.

HARRY E. KAPLAN.
BERNARD L. BOUER.